Nov. 3, 1931.                E. MAYER                1,830,475
                         CAMERA TRIPOD CLUTCH
                         Filed July 26, 1929
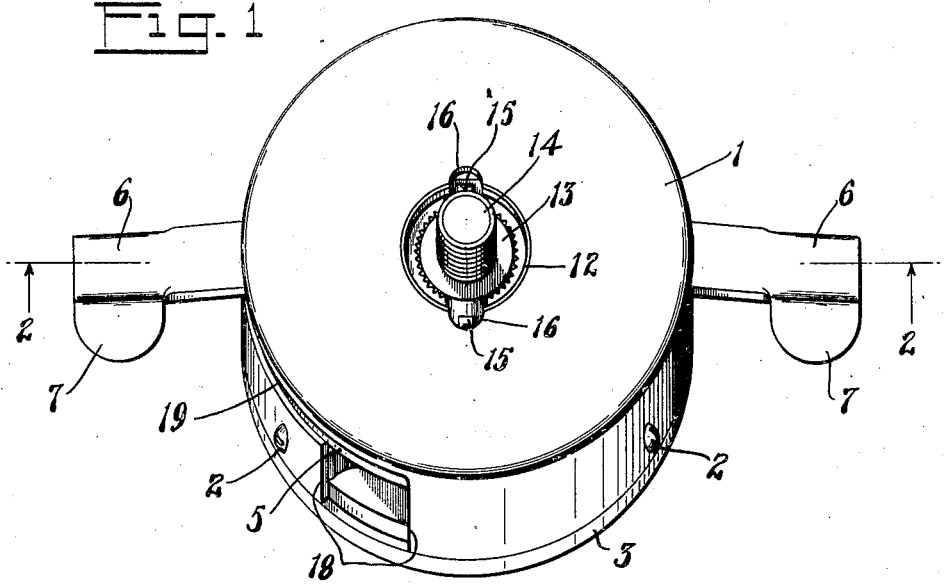
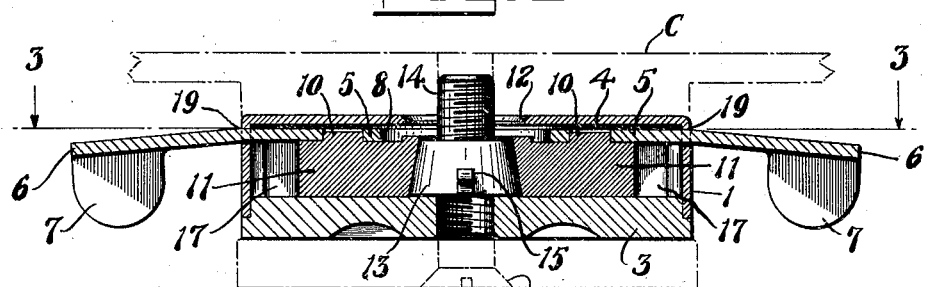
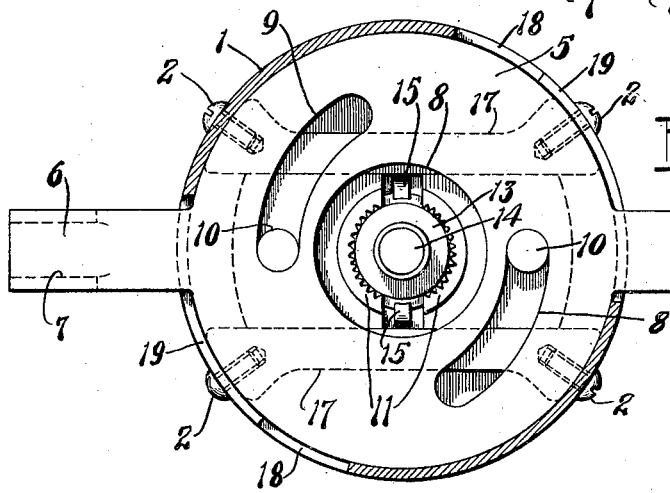
INVENTOR
Emil Mayer
BY
Mock & Blum
ATTORNEYS Patented Nov. 3, 1931

1,830,475

UNITED STATES PATENT OFFICE

EMIL MAYER, OF VIENNA, AUSTRIA, ASSIGNOR TO DREM PRODUCTS CORPORATION, OF NEW YORK, N. Y., A CORPORATION OF NEW YORK

CAMERA TRIPOD CLUTCH

Application filed July 26, 1929, Serial No. 381,108, and in Germany April 25, 1929.

My invention relates to a new and improved camera tripod clutch.

One of the objects of my invention is to produce a simple and efficient device for locking or clutching a camera to a tripod, so that the device has a minimum number of parts and can be readily assembled and taken apart.

Another object of my invention is to produce a device whereby the camera will be urged in an axial direction to be frictionally clamped against the clutch.

Another object of my invention is to produce a device having a laterally movable member or members, that is, a member or members which move in a direction perpendicular to the axis of the tripod, which shall operate against an inclined surface to force the camera in an axial direction.

Another object of my invention is to produce a camera lock or clutch which shall operate by a turning movement of a single actuating member.

Other objects of my invention will be set forth in the following description and drawings, which illustrate a preferred embodiment thereof, it being understood that the above general statement of the objects of my invention is intended to generally explain the same without limiting it in any manner.

Fig. 1 is a perspective view of the improved device.

Fig. 2 is a sectional view on the line 2—2 of Fig. 1.

Fig. 3 is a sectional view on the line 3—3 of Fig. 2.

The device comprises a base plate 3 having upstanding flanges 17 provided with enlarged ends of circular peripheral contour, as shown in dotted lines in Fig. 3. Said flanges 17 have parallel adjacent walls which serve to guide the movement of the clutch jaw or jaws.

A casing 1 is connected to base 3 by clamping screws 2, which as shown in Fig. 3, engage the enlarged ends of flanges 17.

The base plate 3 is immovably connected to tripod T by a tripod screw T' which engages the threaded wall of a recess in said base plate.

The camera C has a holding screw 14 connected thereto, and said screw 14 has a tapered head 13 (shown as frustro-conical in this embodiment) provided with diametrical opposite lugs 15.

The jaws 11 have inner knurled faces, and the head 13 may also be knurled. The lugs 15 could be omitted without departing from the invention.

The jaws 11 have upstanding bosses 10 which are located in eccentric or cam grooves or slots 8 of an actuating ring 5, provided with radially extending arms 6, which have projections 7. The ring 5 abuts a friction washer 4 connected to the inner surface of the top of casing 1. The periphery of ring 5 fits against the vertical wall of casing 1, so that the actuating ring 5 is turnably held within the casing. The friction washer 4, made of leather or other suitable material, prevents the ring 5 from shifting from the position to which it is adjusted.

It would not be departing from the invention to substitute any suitable form of friction device for the washer 4.

The casing 1 is provided with diametrically opposite L-shaped slots having vertical branches 18 and horizontal branches 19.

The parts can be assembled by holding the arms 6 aligned with vertical branches 18.

The top of the casing 1 is provided with aligned radial recesses 16, with which the lugs 15 are aligned when the device is in the locking position shown in Fig. 1.

When the ring 5 is turned from the position shown in Fig. 1, the cam grooves 8 operate to retract the jaws 11 from the head 13, thus releasing the camera screw 14 so that the camera C can be turned in any desired direction, or can be removed from the tripod. The tapered head 13 can then be inserted through the opening 12 in the top of the casing to rest against the base plate.

When the ring 5 is turned until its arms occupy the position shown in Fig. 1, the jaws 11 are moved to clamp head 13.

As shown in Fig. 2, the inner clamping walls of jaws 11 are inclined, so that when they press on the tapered head 13, a powerful axial pressure is exerted against screw 14, so that the bottom of camera C is powerfully urged against the top of casing 1, which has a suitable yielding friction surface, so that the camera is locked in position, not only by the lateral clamping action of jaws 11, but by the powerful axial clamping force produced. The use of the axial clamping force is wholly new, and it may be employed independent of the other features disclosed herein.

The side-walls of the head 13 could be of circular contour instead of having the straight line contour shown, so that said head 13 could be a portion of a sphere for example, the jaws 13 having corresponding concave knurled clamping surfaces. The screw could be replaced by any member having a tapered head.

The device can comprise a single movable clamping jaw, or more than two movable clamping jaws, without departing from the invention, the essential feature being to exert a vertical force on the camera.

Although I have shown and described the device as being held in the vertical position, it is clear that the action is the same if it is held in any position.

I have shown a preferred embodiment of my invention, but it is clear that numerous changes and omissions could be made without departing from its spirit.

I claim:

1. A camera tripod clutch comprising a base plate connected to a casing, said base plate having upstanding flanges provided with parallel adjacent walls to form a guide, said flanges being located within said casing, clamping jaws slidably located in said guide, said jaws having inclined adjacent walls adapted to engage a tapered member and to axially urge the same, a turnable ring located in said casing and having eccentric grooves, said jaws having bosses located in said grooves, and means projecting from said casing to turn said ring.

2. A camera tripod clutch comprising a base plate, a casing connected to said base plate and having an L-shaped slot provided with a branch which is substantially perpendicular to said base plate and another branch which is substantially parallel to said base plate, guide means connected to said base plate and located within said casing, jaw means slidably mounted in said guide means, and a turnable actuating device for said jaw means having an arm projecting from and movable in said parallel branch.

In testimony whereof I affix my signature.

EMIL MAYER.